United States Patent [19]

Hong et al.

[11] Patent Number: 5,283,672
[45] Date of Patent: Feb. 1, 1994

[54] HOLOGRAPHIC TECHNIQUES FOR GENERATING HIGH RESOLUTION TELESCOPIC IMAGES

[75] Inventors: John H. Hong, Moorpark; Pochi A. Yeh, Thousand Oaks, both of Calif.

[73] Assignee: Rockwell International Corporation, Seal Beach, Calif.

[21] Appl. No.: 878,147

[22] Filed: May 4, 1992

[51] Int. Cl.⁵ .................. G03H 1/02; G03H 1/26; G02B 23/00
[52] U.S. Cl. .................................. 359/7; 359/4; 359/24; 359/30; 359/399
[58] Field of Search .................. 359/1, 4, 7, 22, 24, 359/30, 31, 32, 33, 35, 399, 618, 619, 741, 800, 900, 419

[56] References Cited

U.S. PATENT DOCUMENTS

| | | | |
|---|---|---|---|
| 3,507,547 | 4/1970 | Thomas | 359/419 |
| 4,275,454 | 6/1981 | Klooster | 359/29 X |
| 4,478,481 | 10/1984 | Fusek et al. | 359/30 |
| 4,586,135 | 4/1986 | Matsumoto | 364/414 |
| 4,633,883 | 1/1987 | Matsui | 128/660 |
| 4,653,000 | 3/1987 | Matsumoto | 364/414 |
| 4,687,281 | 8/1987 | Gross | 350/3.66 |
| 4,953,964 | 9/1990 | Anafi et al. | 359/419 |
| 5,159,489 | 10/1992 | Massie et al. | 359/419 |

Primary Examiner—Bruce Y. Arnold
Assistant Examiner—David R. Parsons
Attorney, Agent, or Firm—John C. McFarren

[57] ABSTRACT

Holographic apparatus and methods are provided for generating high resolution telescopic images using low cost, small aperture lenses. Holographic media, such as photorefractive crystals, are used in conjunction with multiple and/or synthetic aperture techniques. In a multiple aperture system, a thin nonlinear holographic medium is used with a plurality of small optical lenses to compensate for the inherent piston and tilt errors of the lenses, thereby providing higher resolution. In another embodiment, synthetic aperture techniques are accomplished by illuminating a far field object with coherent light, deriving a reference beam from the coherent light, and changing the position of the reference beam in accordance with a computational formula. A hologram is formed from a sequence of image exposures in the holographic media, each made at different positions with respect to the image. The sequence of exposures is combined and phased in the holographic media to synthesize a high resolution image normally achievable only with a relatively larger aperture.

11 Claims, 2 Drawing Sheets

HOLOGRAPHIC TECHNIQUES FOR GENERATING HIGH RESOLUTION TELESCOPIC IMAGES

TECHNICAL FIELD

The present invention relates to telescopic imaging systems and, in particular, to optical systems using holographic techniques for generating high resolution images with small optical lenses.

BACKGROUND OF THE INVENTION

In far field imaging systems, such as telescopes, it is desirable to have diffraction limited lenses (i.e., devoid of aberrations) with very large apertures. It is well known that the resolution achievable with a diffraction limited lens is inversely proportional to the size of its aperture. Thus, larger lenses, which have larger apertures, produce finer resolution. Large optical lenses, however, are generally limited by their great weight and cost.

One method of avoiding large, high quality, expensive lenses is the use of an array of smaller, lower quality lenses. the use of an array of lenses increases the cross sectional area, and therefore the resolution of the system, but it also increases the aberration that must be corrected. Furthermore, the combination of multiple optical images at a common plane generates problems of angular resolution, piston error resulting from different lens distances from the object plane, and tilt error resulting from different lens angles. In previous optical imaging systems, the superposition of many individually produced images has not achieved the high resolution desired, especially at the small energy levels normally received. Thus, it has not been considered practical to use multiple apertures or synthetic imaging in most optical systems.

A need has therefore been recognized for an optical imaging system that employs multiple and/or synthetic aperture techniques to improve the resolution of low cost lenses. Furthermore, it is highly desirable that such a system provide automatic compensation for the optical errors inherent in a multiple or synthetic aperture system.

SUMMARY OF THE INVENTION

The present invention comprises holographic apparatus and methods for generating high resolution telescopic images using low cost, small aperture lenses. The invention combines multiple and/or synthetic aperture techniques with holographic media, such as photorefractive crystals, for recording holograms. In a multiple aperture system, the present invention may comprise a thin nonlinear holographic crystal used in conjunction with a plurality of small optical lenses. The holographic crystal permits the use of smaller lenses in lieu of a large, high quality lens, by automatically compensating for the piston and tilt errors inherent in a multiple aperture system. In another embodiment, synthetic aperture techniques are accomplished by illuminating a far field object with coherent light, deriving a reference beam from the coherent light, and changing the position of the reference beam in accordance with a computational formula. A hologram is formed from a sequence of image exposures in the holographic media, each typically made at different positions with respect to the image. The sequence of exposures is combined and phased in the holographic media to synthesize a high resolution image normally achievable only with a relatively larger aperture.

A principal object of the invention is the generation of high resolution telescopic images without the use of large, high quality optical lenses. A feature of the invention is the use of holographic techniques in combination with multiple and/or synthetic aperture imaging systems. An advantage of the invention is the generation of high quality images using low weight, low cost optical lenses.

BRIEF DESCRIPTION OF THE DRAWINGS

For a more complete understanding of the present invention and for further advantages thereof, the following Detailed Description of the Preferred Embodiments makes reference to the accompanying Drawings, in which.

DETAILED DESCRIPTION OF THE PREFERRED EMBODIMENTS

The present invention comprises holographic apparatus and methods for generating high resolution telescopic images using low cost, small aperture lenses. An inherent problem in forming high resolution images with multiple aperture systems is the requirement for strict alignment and control of the various optical components. Well known active control methods, which use actuators and phase sensors to adjust piston error (path length) and tilt error, are undesirably cumbersome, expensive, and computationally intensive for large systems. In a multiple aperture imaging system of the present invention, holographic techniques are used for automatic phase correction.

Figure 1:
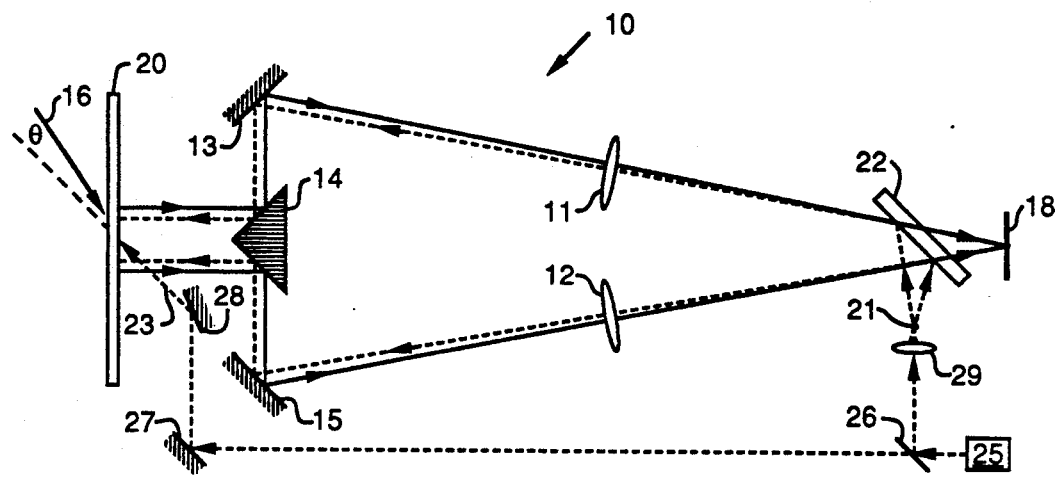
FIG. 1 is a schematic illustration of a multiple aperture imaging system of the present invention that utilizes a holographic medium, such as a thin photorefractive crystal, for automatic phase correction.

The present invention utilizes a thin holographic medium for automatically correcting piston and tilt errors in multiple aperture imaging systems. The holographic medium typically comprises a thin photorefractive crystal, such as $BaTiO_3$, $LiNbO_3$, SBN, or BSO, for example, but any holographic material, including photopolymers and film, may be used. FIG. 1 is a schematic diagram of a multiple aperture system 10 of the present invention illustrating two of the multiple apertures. Small aperture lenses 11 and 12 are used in conjunction with mirrors 13, 14, and 15 to split an incoming image wave front, indicated by solid arrow 16, and recombine it at image plane 18. In multiple aperture system 10 of the present invention, incoming wave front 16 impinges upon a thin photorefractive crystal 20 before being split and directed through the multiple apertures.

Before receiving incoming wave front 16, a hologram is written in photorefractive crystal 20. A reference point source 21 directs light toward beam splitter 22, which reflects the reference light to illuminate imaging system 10 from the backward direction (i.e., from the imaging plane toward the object), as indicated by the dotted line arrows. Light from reference point source 21 thus passes through lenses 11 and 12 and is reflected by mirrors 13, 14, and 15 into photorefractive crystal 20. Mirror 14 may be pyramidal in shape, for example, and mirrors 13 and 15 may comprise a ring-shaped structure surrounding pyramidal mirror 14. A reference plane wave, indicated by dotted line arrow 23, is also directed into crystal 20 to interfere with light from point source 21 to form a hologram within crystal 20 as a result of the well known photorefractive effect. As is well known in the art of holography, reference point source 21 and reference plane wave 23 are typically derived from a common source 25 of coherent light using, for example, a beam splitter 26, mirrors 27 and 28, and optics 29, as illustrated in FIG. 1. The hologram thus formed in crystal 20 records the phase errors of multiple aperture system 10 generated by the inherent piston and tilt errors associated with the multiple light paths through system 10.

After the phase errors of system 10 have been recorded in the hologram in crystal 20, reference point source 21 and plane wave 23 are turned off and incoming wave front 16 is directed into crystal 20. Wave front 16 is diffracted by the hologram in crystal 20 and acquires the phase errors of system 10 recorded in the hologram. After acquiring the system phase errors, input wave front 16 is split to propagate through system 10, as indicated by the solid line arrows. The phase errors imparted by the hologram are essentially undone, or canceled, by the piston and tilt errors of system 10 as split wave front 16 is recombined at image plane 18. The finite thickness of crystal 20 limits the field of view of system 10, as indicated by angle $\theta$, because Bragg selectivity effects become more severe as the thickness of crystal 20 increases.

The hologram formed in photorefractive crystal 20 must satisfy two important constraints. First, because image forming system 10 is interferometric, the holographic predistortion recorded in photorefractive crystal 20 must be imposed at a common plane before incoming wave front 16 is split into the multiple paths of system 10. This ensures an equalization of the various path lengths through the different lenses that make up the interferometric imaging system. Second, the hologram formed in photorefractive crystal 20 must be sufficiently thin to provide non-zero response to incoming wave fronts 16 that are not exactly counter-propagating with respect to reference plane wave 23 used to record the hologram. If the hologram or photorefractive crystal 20 is excessively thick, Bragg selectivity will reduce the diffraction for incoming waves 16 that are off-axis. As stated above, the thickness of crystal 20 determines the field of view of multiple aperture imaging system 10.

A second embodiment of the present invention uses holographic techniques for synthesizing a high resolution image from a series of low resolution images. Although the following description is limited to one-dimensional imaging (i.e., one-dimensional objects), extension of the principles to the two-dimensional case is considered trivial for one having ordinary skill in the art. The following is a list of parameters used in conjunction with FIG. 2 and the description that follows:

D = lens aperture;
F = focal length of lens;
$d_o$ = object to lens distance;
$d_i$ = lens to image plane distance;
d = translation distance per exposure (relative position between object and camera);
n = exposure index (n = −N, −N+1, ... −1, 0, 1, ... N−1, N).
$\lambda$ = wavelength of light;
$x_o$ = object plane coordinate;
$x_i$ = image plane coordinate;

For reasons of economy, as stated above, it is desirable to have high resolution imaging systems that use small lenses. A major reason for this in the expense of grinding large lenses that are diffraction limited (i.e., devoid of aberrations). Because the resolution of a diffraction limited imaging system is inversely proportional to the aperture of the lens (assumed to be the smallest aperture of the system), there is a strong motivation for large aperture synthesizing techniques. In the synthetic aperture imaging system of the present invention, an effective aperture, which is much larger than the actual physical aperture, is synthesized by coherently combining a set of many images taken at different observation positions along a specified trajectory.

Figure 2:
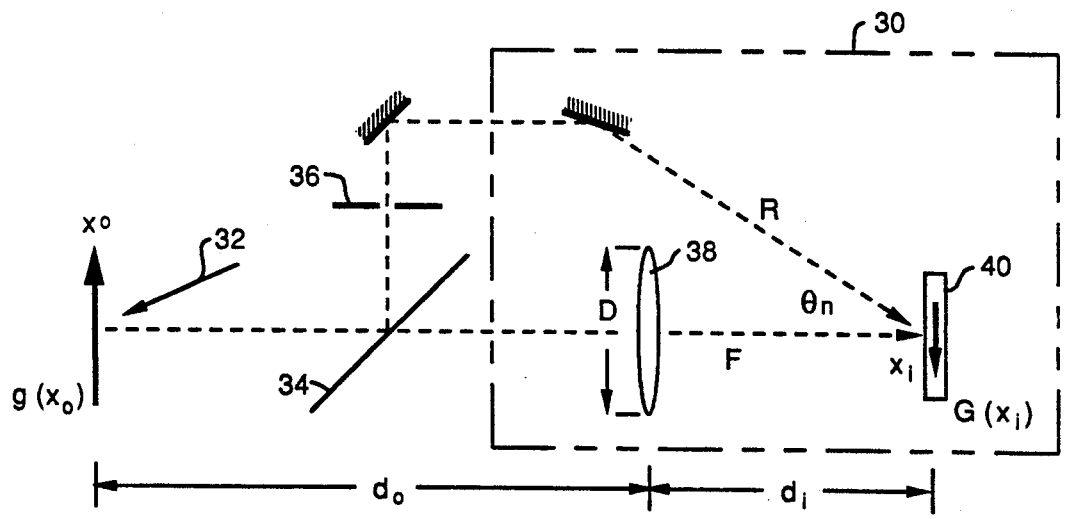
FIG. 2 is a schematic diagram of a basic holographic camera of the present invention for synthetic aperture imaging.

Referring to FIG. 2, when the object-to-lens distance $d_o$ and the lens-to-image plane distance $d_i$ satisfy the imaging equation for a lens having a focal length F, $$\frac{1}{d_o} + \frac{1}{d_i} = \frac{1}{F}, \quad (1)$$

then the amplitude of the image $x_i$ that forms at the image plane can be shown to be equal to $$G(x_i) = \quad (2)$$

$$K \exp\left(i\frac{\pi}{\lambda d_i} x_i^2\right) \int_{-\infty}^{\infty} g(x_o) \exp\left(i\frac{\pi}{\lambda d_o} x_o^2\right) \mathrm{sinc}\left[\left(\frac{x_i}{d_i} + \frac{x_o}{d_o}\right)\frac{D}{\lambda}\right] dx_o,$$

where D is the physical aperture of the lens (i.e., its diameter), and where $$\mathrm{sinc}(z) = \frac{\sin \pi z}{\pi z}. \quad (3)$$

The resolution is inversely proportional to the aperture of the lens (D) since the smallest spot resolvable with a lens has a width equal to $2\lambda/D$.

The present method of synthesizing a high resolution image from a series of low resolution images is based on the foregoing background principles. FIG. 2 illustrates a holographic camera 30 that is used to create a multiply exposed image hologram of a distant object $x_o$. As in a synthetic aperture radar, holographic camera 30 must be moved along a specified trajectory, such as a straight line, for example.

As shown in FIG. 2, object $x_o$ is illuminated by a source of coherent light 32. Coherent light from object $x_o$ is split by a beam splitter 34. The portion of coherent light reflected by beam splitter 34 may be passed through a pin hole filter 36 to derive a reference beam R, as is well known in the art. Coherent light from object $x_o$ is directed by a lens 38 to interfere with reference beam R in a holographic medium 40 to form an image $x_i$ of object $x_o$. For each of the multiple exposures, holographic camera moves a specific distance along its known trajectory, and the positions of reference beam R and holographic medium 40 are adjusted with respect to lens 38.

The optical field amplitude at the image plane for an object displaced by an amount nd (i.e., for the $n^{th}$ exposure) from the centered position (i.e., the position where the object is on the optical axis of the lens) is given by the expression $$G_{nd}(x_i) = K \exp\left(i\frac{\pi}{\lambda d_i} x_i^2\right) \int_{-\infty}^{\infty} g(x_o) \exp\left(i\frac{\pi}{\lambda d_o}(x_o - nd)^2\right) \mathrm{sinc}\left[\left(\frac{x_i}{d_i} + \frac{x_o}{d_o} - \frac{nd}{d_o}\right)\frac{D}{\lambda}\right] dx_o. \tag{4}$$

The displacement of the sinc [ ] function means that the image formed at the image plane is shifted slightly for each exposure (i.e., by $nd d_i/d_o$). To compensate for this displacement, holographic medium 40 is moved at the image plane by the same amount for each exposure so that all of the exposures are aligned. At the coordinates of holographic medium 40, the amplitude is given by $$G_{nd}(x_i) = K \exp\left(i\frac{\pi}{\lambda d_i} x_i^2\right) \exp\left(i\frac{\lambda d_o n^2 d^2}{\lambda d_i F}\right) \int_{-\infty}^{\infty} g(x_o) \exp\left(i\frac{\pi}{\lambda d_o} x_o^2\right) \exp\left(i\frac{2\pi}{\lambda d_o}(x_i - x_o)nd\right) \mathrm{sinc}\left[\left(\frac{x_i}{d_i} + \frac{x_o}{d_o}\right)\frac{D}{\lambda}\right] dx_o. \tag{5}$$

In most cases, the displacement requirement of holographic medium 40 can be relaxed. The displacement is $nd d_i/d_o$. For a conservative object-to-lens distance $d_o = 10$ km, translation distance $d = 10$ cm, and lens-to-image distance $d_i = 1$ m, the required displacement is 10 n μm. where n is the exposure index. If the required resolution results in images having their finest structures larger than this dimension, the displacement has no effect. Thus, for a small number of exposures, the displacement is generally small enough to be neglected.

Figure 3:
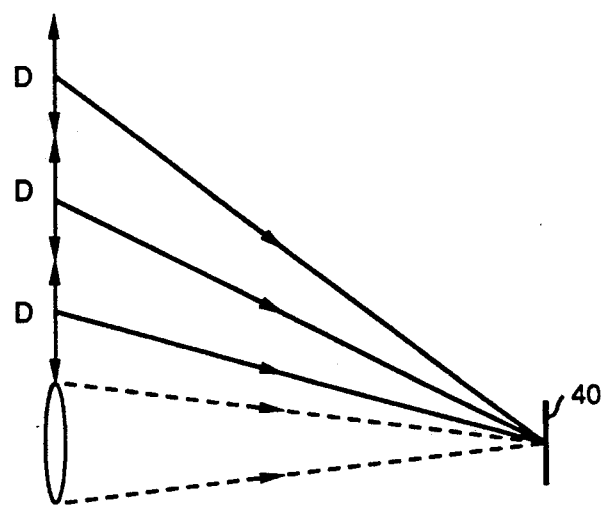
FIG. 3 is a schematic diagram illustrating a range of reference beam angles for a seven-exposure image where the translation distance "d" equals the lens aperture "D" in the synthetic aperture imaging system of the present invention.

Holographic medium 40 records the mutual interference pattern formed by the intersection of the image bearing beam and the reference beam at the image plane. Multiple exposures, each with reference beam R at a different location, are performed to achieve proper phasing for image formation. As shown in FIG. 3, which illustrates the case where d=D, the number of exposures is limited by the finite range of reference beam angles available. Also, it is desirable to use only one side of the angular range for reference beam R (as shown). Using beam angles on both sides of the axis precludes the ability to separate the various holographic terms (i.e., real image from conjugate image) using angular means.

Positioning reference beam R for the $n^{th}$ exposure to be directed at an angle $\theta_n$ from the optical axis is given by $$\theta_n = \sin^{-1}\left(\frac{\lambda \beta_0}{2\pi} + \frac{nd}{F}\right), \tag{6}$$

where $\beta_0$ is the quiescent reference beam orientation. The reference amplitude can be expressed as $$R_n(x) = \exp\left(i\beta_0 x + \frac{2\pi n d x}{\lambda F}\right). \tag{7}$$

For each exposure, holographic medium 40 is exposed simultaneously to both the reference beam $R_n(x)$ and the object beam $G_{nd}(x)$ so that the intensity distribution may be expressed as $$\begin{aligned} I_n(x) &= |R_n(x) + G_{nd}(x)|^2 \\ &= |R_n(x)|^2 + R_n^*(x)G_{nd}(x) + R_n(x)G_{nd}^*(x) + |G_{nd}(x)|^2. \end{aligned} \tag{8}$$

The second term of Equation (8), which contains the real image multiplied by the conjugate of the reference beam, is the term of interest. During image reconstruction, this term is differentiated from the other terms simply by angular distinction. Restated, the useful holographic term is given by $$\begin{aligned} s_n(x) &= R_n^*(x) G_{nd}(x) \\ &= K \exp\left(-i\beta_0 x - \frac{2\pi n d x}{\lambda F}\right) \exp\left(i\frac{\pi}{\lambda d_i} x^2\right) \exp\left(i\frac{\lambda d_o n^2 d^2}{\lambda d_i F}\right) \\ &\int_{-\infty}^{\infty} g(x_o) \exp\left(i\frac{\pi}{\lambda d_o} x_o^2\right) \exp\left(i\frac{2\pi}{\lambda d_o}(x_i - x_o)nd\right) \mathrm{sinc}\left[\left(\frac{x_i}{d_i} + \frac{x_o}{d_o}\right)\frac{D}{\lambda}\right] dx_o. \end{aligned} \tag{9}$$

The piston phase term can be eliminated from Equation (9) either by 1) assuming that its factors are controlled so that the phase factor is unity for all n, or by 2) imposing the same piston phase on reference beam R for each exposure. Assuming that either of these has been done, the holographic terms for all exposures (i.e., 2N+1 exposures) are summed as follows:

$$\sum_{n=-N}^{N} s_n(x) = K \exp(-i\beta_0 x)\exp\left(i\frac{\pi}{\lambda d_i} x^2\right) \quad (10)$$

$$\int_{-\infty}^{\infty} g(x_o)\exp\left(i\frac{\pi}{\lambda d_o} x_o^2\right)\sum_{n=-N}^{N}\exp\left[-i\frac{2\pi}{\lambda}\left(\frac{x}{d_i}+\frac{x_o}{d_o}\right)nd\right]\mathrm{sinc}\left[\left(\frac{x}{d_i}+\frac{x_o}{d_o}\right)\frac{D}{\lambda}\right]dx_o.$$

thus $$\sum_{n=-N}^{N} s_n(x) = K \exp(-i\beta_0 x)\exp\left(i\frac{\pi}{\lambda d_i} x^2\right)$$

$$\int_{-\infty}^{\infty} g(x_o)\exp\left(i\frac{\pi}{\lambda d_o} x_o^2\right)\frac{\sin\left[\left(N+\frac{1}{2}\right)\frac{2\pi d}{\lambda}\left(\frac{x}{d_i}+\frac{x_o}{d_o}\right)\right]}{\sin\left[\frac{\pi d}{\lambda}\left(\frac{x}{d_i}+\frac{x_o}{d_o}\right)\right]}\mathrm{sinc}\left[\left(\frac{x}{d_i}+\frac{x_o}{d_o}\right)\frac{D}{\lambda}\right]dx_o.$$

The desired image is reconstructed from the recorded hologram by reading it out with reference beam R for $n=0$. The angle of reference beam R should be $$\theta_0 = \sin^{-1}\left(\frac{\lambda\beta_0}{2\pi}\right). \quad (11)$$

Omitting the quadratic phase term $$\exp\left(i\frac{\pi}{\lambda d_o} x_o^2\right).$$

which is present for any imaging system, the image is the result of convoluting the object function $g(x_o)$ with a smoothing kernel. The sharpness of the smoothing kernel determines the resolution of the image: sharper kernels produce sharper images. The sharpness of smoothing kernels can be compared by plotting the image distributions resulting from a point source object. The single exposure image is given by $$h_1(x) = \mathrm{sinc}\left[\frac{x}{d_i}\frac{D}{\lambda}\right], \quad (12)$$

whereas the normalized case for $2N+1$ exposures is given by $$h_{2N+1}(x) = \frac{\sin\left[\left(N+\frac{1}{2}\right)\frac{2\pi d}{\lambda}\left(\frac{x}{d_i}\right)\right]}{\left(N+\frac{1}{2}\right)\sin\left[\frac{\pi d}{\lambda}\left(\frac{x}{d_i}\right)\right]}\mathrm{sinc}\left[\frac{x}{d_i}\frac{D}{\lambda}\right], \quad (13)$$

so that $$h_{2N+1}(x) = \mathrm{sinc}\left[\left(N+\frac{1}{2}\right)\frac{x}{d_i}\frac{D}{\lambda}\right],$$

for $d = D$.

Figure 4:
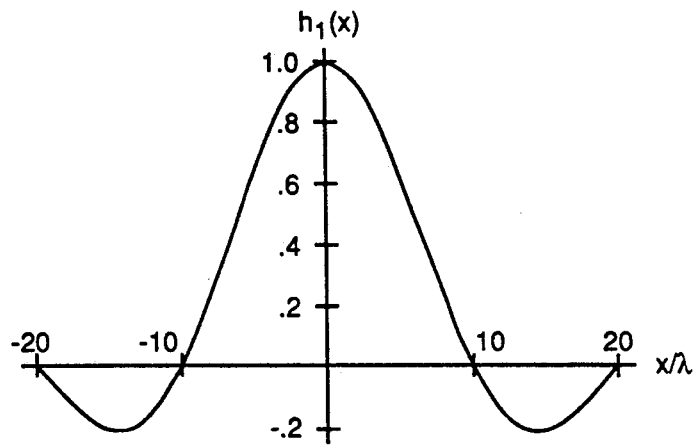
FIG. 4 is a graph of a smoothing kernel for a single exposure image using the synthetic aperture imaging system of the present invention.
Figure 5:
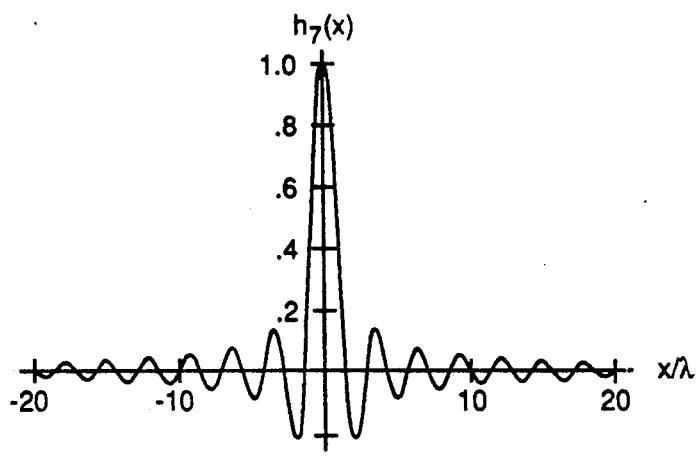
FIG. 5 is a graph of a smoothing kernel for a seven-exposure image using the synthetic aperture imaging system of the present invention.

FIG. 4 is a plot of the smoothing kernel for $h_1(x)$ and FIG. 5 is a plot for $h_7(x)$, where $N=3$, $d=D=10$ cm, and $d_i=1$ m. The kernels are plotted as functions of the normalized distance $x/\lambda$. The ratio of the widths of the main lobes of the multiple exposure image and the single exposure image is equal to $2N+1$, so that the resolution gain factor is equal to precisely the number of exposures made. The multiple exposure kernel of FIG. 5 can be made narrower with the same number of exposures by simply taking the displacement d to be greater then D, but this would result in undesirable aliasing distortions.

Although the present invention has been described with respect to specific embodiments thereof, various changes and modifications can be carried out by those skilled in the art without departing from the scope of the invention. Therefore, it is intended that the present invention encompass such changes and modifications as fall within the scope of the appended claims.

We claim:

1. A multiple aperture imaging system, comprising:
   a plurality of lenses forming a plurality of apertures;
   a thin holographic medium for receiving an incoming wave front;
   a reference point source for projecting light from an image plane, through said plurality of apertures, and onto said holographic medium;
   means for directing plane wave light onto said holographic medium, said plane wave and point source derived from a common source of coherent light and interfering and writing a hologram in said holographic medium, said hologram recording phase errors resulting from piston and tilt errors associated with said plurality of apertures;
   said hologram diffracting said incoming wave front, said diffracted wave front containing said phase errors;
   said holographic medium sufficiently thin to provide non-zero response to said incoming wave front not exactly counter-propagating with respect to said reference plane wave used to write said hologram;
   means for splitting said diffracted wave front for propagation through said plurality of apertures, said propagation canceling said phase errors; and
   means for recombining said diffracted and split wave front to form a high resolution image at said image plane.

2. The multiple aperture imaging system of claim 1, wherein said holographic medium comprises a thin photorefractive crystal.

3. The multiple aperture imaging system of claim 1, wherein said splitting means comprises a plurality of mirrors.

4. The multiple aperture imaging system of claim 1, wherein said plurality of lenses comprise small aperture lenses.

5. A method of multiple aperture imaging, comprising the steps of:
- forming a plurality of apertures with a plurality of lenses;
- providing a thin holographic medium for receiving an incoming wave front;
- projecting a reference point source of light from an image plane, through said plurality of apertures, and onto said holographic medium;
- directing a reference plane wave of light onto said holographic medium, said point source and plane wave derived from a common source of coherent light;
- interfering said plane wave and point source light in said holographic medium;
- writing a hologram in said holographic medium, said hologram recording phase errors resulting from piston and tilt errors associated with said plurality of apertures;
- diffracting said incoming wave front with said hologram, said diffracted wave front containing said phase errors;
- said thin holographic medium providing non-zero response to said incoming wave front not exactly counter-propagating with respect to said reference plane wave used for writing said hologram;
- splitting said diffracted wave front for propagation through said plurality of apertures, said propagation canceling said phase errors; and
- recombining said diffracted and split wave front to form a high resolution image at said image plane.

6. The method of claim 5, wherein the step of providing a holographic medium comprises providing a thin photorefractive crystal.

7. The method of claim 5, wherein the step of splitting said diffracted wave front comprises splitting said wave front with a plurality of mirrors.

8. The method of claim 5, wherein the step of providing said plurality of lenses comprises providing small aperture lenses.

9. A method of synthetic aperture imaging, comprising the steps of:
- providing an imaging lens for projecting an image on an image plane;
- providing a holographic medium at said image plane;
- illuminating a far field object with coherent light;
- imaging light from said far field object on said holographic medium;
- deriving a reference beam of light from the light from said far field object;
- directing said reference beam on said holographic medium to interfere with said imaging light to form a hologram in said holographic medium;
- moving said lens with respect to said far field object and said reference beam with respect to an optical axis of said lens to write a plurality of said holograms in said holographic medium; and
- reconstructing a high resolution image of said far field object by illuminating said plurality of holograms with said reference beam at a predetermined angle with respect to said optical axis.

10. The method of claim 9, wherein said imaging lens comprises a small aperture lens.

11. The method of claim 10, wherein said holographic medium comprises a photorefractive crystal.

* * * * *